(12) United States Patent
Rebulla et al.

(10) Patent No.: US 7,617,331 B2
(45) Date of Patent: Nov. 10, 2009

(54) SYSTEM AND METHOD OF DOUBLE ADDRESS DETECTION

(75) Inventors: Renato RR Rebulla, Trieste (IT); Steven L Scorfield, Chingford (GB)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/556,334

(22) Filed: Nov. 3, 2006

(65) Prior Publication Data

US 2008/0109563 A1 May 8, 2008

(51) Int. Cl.
*G06F 13/10* (2006.01)
(52) U.S. Cl. .................. 710/3; 710/4; 710/15; 710/16; 714/53
(58) Field of Classification Search ........................ None
See application file for complete search history.

(56) References Cited

U.S. PATENT DOCUMENTS

| 4,916,432 A | 4/1990 | Tice |
| 6,195,003 B1 * | 2/2001 | Ichikawa et al. ............ 340/506 |
| 2002/0049822 A1 * | 4/2002 | Burkhardt et al. ........... 709/208 |

FOREIGN PATENT DOCUMENTS

JP 7-325993 * 12/1995

* cited by examiner

*Primary Examiner*—Ilwoo Park
(74) *Attorney, Agent, or Firm*—Husch Blackwell Sanders Welsh & Katz

(57) ABSTRACT

A plurality of detectors can be evaluated to determine if more than one has been assigned the same address. Responsive thereto, such detectors could be identified for follow-up maintenance, or service.

19 Claims, 2 Drawing Sheets

SYSTEM AND METHOD OF DOUBLE ADDRESS DETECTION

FIELD

The invention pertains to region monitoring systems. More particularly, the invention pertains to such systems which include addressable units and processes to determine if at least two of such units have been assigned a common address.

BACKGROUND

A conventional fire alarm system will provide an adequate scheme for the protection of many small buildings. In larger, more complex buildings however, more sophisticated, addressable, fire alarm systems tend to be used. These systems offer benefits in speed of detection, identification of the location of a fire and easier maintenance. Such systems also provide tolerance to faults in the wiring. This in turn enables a single pair of wires to be used to connect 100 or more devices to the system. This results in cost savings in the cabling and installation. In larger installations, the benefits of improved maintenance and reduced cabling cost are considerable.

One such system has been disclosed and claimed in U.S. Pat. No. 4,916,432 which issued Apr. 10, 1990 and is entitled Smoke and Fire Detection System Communication. The '432 patent is assigned to the assignee hereof and is incorporated by reference herein.

FIG. 1 illustrates an example of a single loop addressable system 10 of a known type. Loop wiring 12 connects to the control unit 14 at each end. Detectors 20a, call points 20b, sounders 20c and interface modules 20d are wired directly to the loop, each having its own address.

The control unit 14 communicates with each device on the loop. If an alarm or fault condition is signaled, or if communications are lost with one or more detectors, the appropriate response is triggered. The loop 12 can be powered from each end so that if it is broken at any point, none of the devices are disconnected from the control unit 14. In addition, the use of short circuit isolators 20e can minimize the area of coverage lost in the case of a short circuit.

Known addressable systems use the same pair of wires to supply power to the loop, and to communicate with devices on the loop. The communication method, or protocol used varies from manufacturer to manufacturer. Known protocols usually switch the supply voltage (typically 24V) to other voltage levels to achieve communication.

One protocol is disclosed in the above noted '432 patent. It will be understood that the above is exemplary only. The present invention can be used with a wide variety of protocols without limitation.

A typical basic protocol has two main parts, a query or poll of a device by the control panel including the device address and control information, and a response from the device giving its status and other information. Precise details of the information transferred will depend on the protocol. In a known form of processing, each device on the loop will be polled in turn. To increase speed around a loop, some protocols allow polling of groups of devices on a single communication.

Known units, such as smoke detectors and the like, all without limitation are usually assigned an unchangeable serial number during manufacture. A unit's, or detector's address is a settable, indicium apart from the unit's serial number.

Different addressable systems provide a variety of structures and methods of setting the address of a device. These include without limitation manually settable switches, dedicated addresses or address cards and automatic, according to the position of the device on the loop.

As described above, addressable monitoring systems, fire, intrusion gas or the like, are based upon a set of devices. The devices are called in some order by a system control unit, for example a fire alarm control panel. Each device is identified by its own address. Typically the control unit, or panel, sends a message containing the address of each installed device sequentially. If the device receives a message with its address, it responds to the panel, sending back the requested information, for example, by sinking current. Otherwise the device ignores the message.

In an addressable monitoring system, such as a fire system, if two devices have the same address, proper communication will not be possible. This 'double address' is seen as a fault by the control panel because it is related to a current sink double that which is normal.

Designing, installing and trouble shooting such monitoring systems can be a difficult task which increases in complexity the bigger the system is. Wrongly setting device addresses is a common occurrence at commissioning time. Such errors can be particularly problematic in large installations where investigation of a large number of devices is required to identify the offending unit or units.

To help with solving the problem, some control units, or panels, employ double address detection circuitry. Whilst this may improve the situation, such circuitry can usually detect abnormal current loading which may, in fact, be caused by problems other than double addressing. This in itself can result in wasted time spent looking for double address faults which don't exist.

Performing double address detection in the control unit also limits the available loop length because double current capability above normal operation must be available for detection. Hence using a method of double address discrimination that does not rely on sensing a double current load could increase the potential loop length substantially.

There is thus a continuing need to be able to detect units that have erroneously been assigned a common address. Preferably solutions to this problem will not require modifications of or additions to the detectors or units to be installed in such monitoring systems. It would also be desirable to be able to upgrade existing monitoring systems with such capabilities.

DETAILED OF DESCRIPTION OF THE INVENTION

Figure 1:
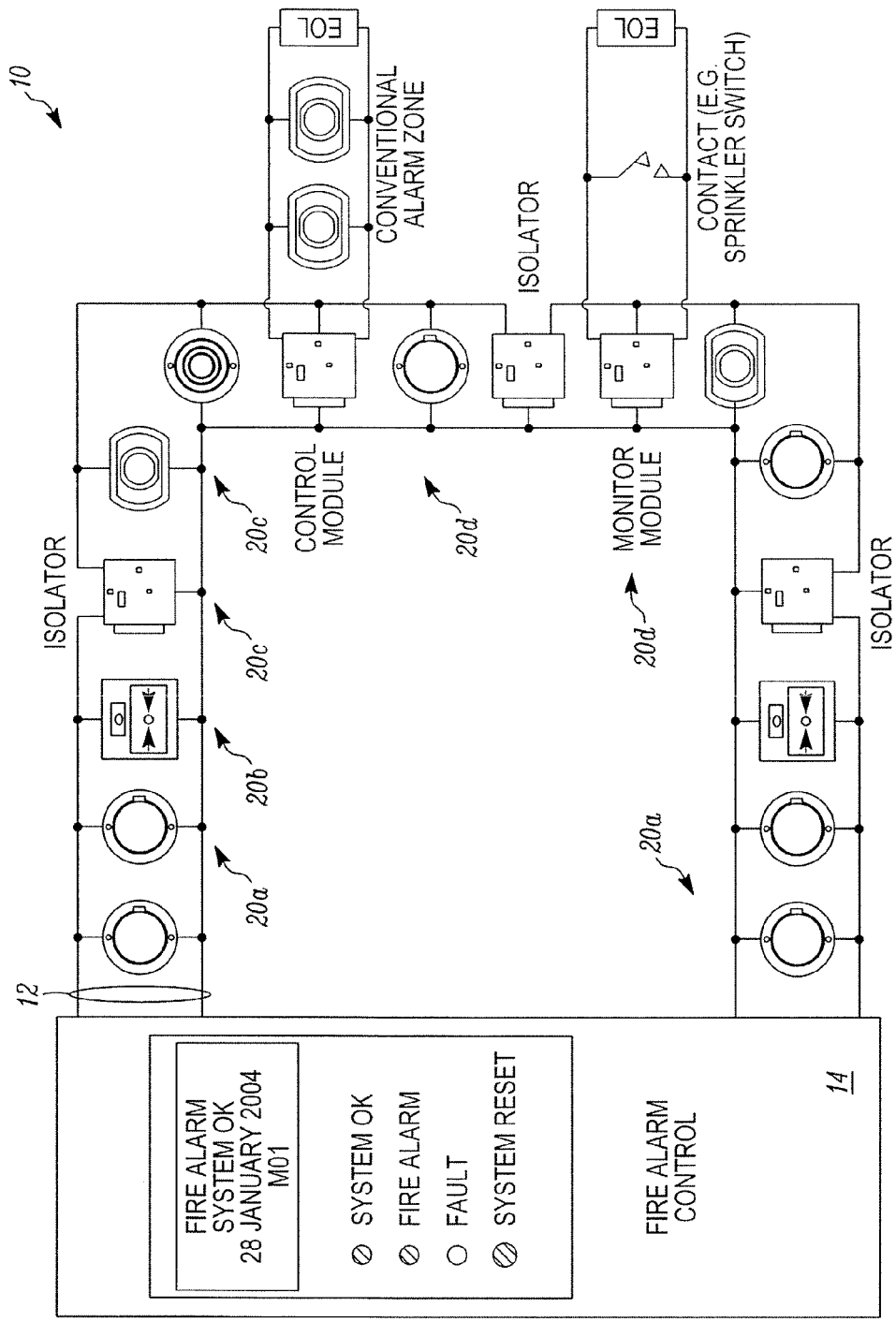
FIG. 1 is an overall diagram of a known type of ambient condition monitoring system.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the present invention implement a process for double address checking through serial number detection in order to differentiate between address and other faults and to maximize the transmission distance on the system communication loop. The result of this process is either an indication of a double address detected or an "all devices installed correctly" signal. The process can include storing a multiple device indication after determining that multiple devices have responded.

The double address detection procedure is based on three system issuable commands together with the factory programmed serial number. The serial number is arranged such that it constitutes, for example, a 32-bit value, which means that there are over 4 billion possible combinations. As a result it is highly unlikely that any two devices will be programmed with the same serial number.

The three commands are (1) "Get address using serial number"—this command obtains the address of a device having a specified serial number; (2) "Get serial number using address"—this command obtains the 4-byte serial number of the device having the specified address; and "Disable answer using serial number"—this command is used during address checking to prevent further answers from a device already detected. Answering is enabled again as soon as a command with a different address is received.

In accordance with the invention, each device in an address range is polled. For a current address, the serial number from that address is requested. The address can be the detector or unit with the next incremented by 1 and address is then considered.

If there is only one device with the current address, it will send its answer. If more than one has the current address, then all will try to respond. In some known digital protocols, a "1" will always override, as it draws current compared to a '0' or no current. Therefore in this case a combined serial number will be received. Similar characteristics can be taken advantage where a "1" is otherwise represented.

A command to get address using serial number SN is then issued to obtain the address of the answering device. If there is no answer or the returned address is different from the current address, an incorrect serial number was produced by the overlapping of the responses and the current address represents a double address position. This request can be sent twice to double check the response and ensure confidence in the result.

If the returned address has the expected value, a command is sent to disable any more answers from that serial number. Therefore the next request for the serial number using that address should have no answer. If there is an answer (after checking twice for data integrity reasons) the current address represents a double address position.

The address is then altered, incremented or decremented. The next address is examined using the same sequence of commands. This process is repeated until all addresses in the range have been considered.

Figure 2:
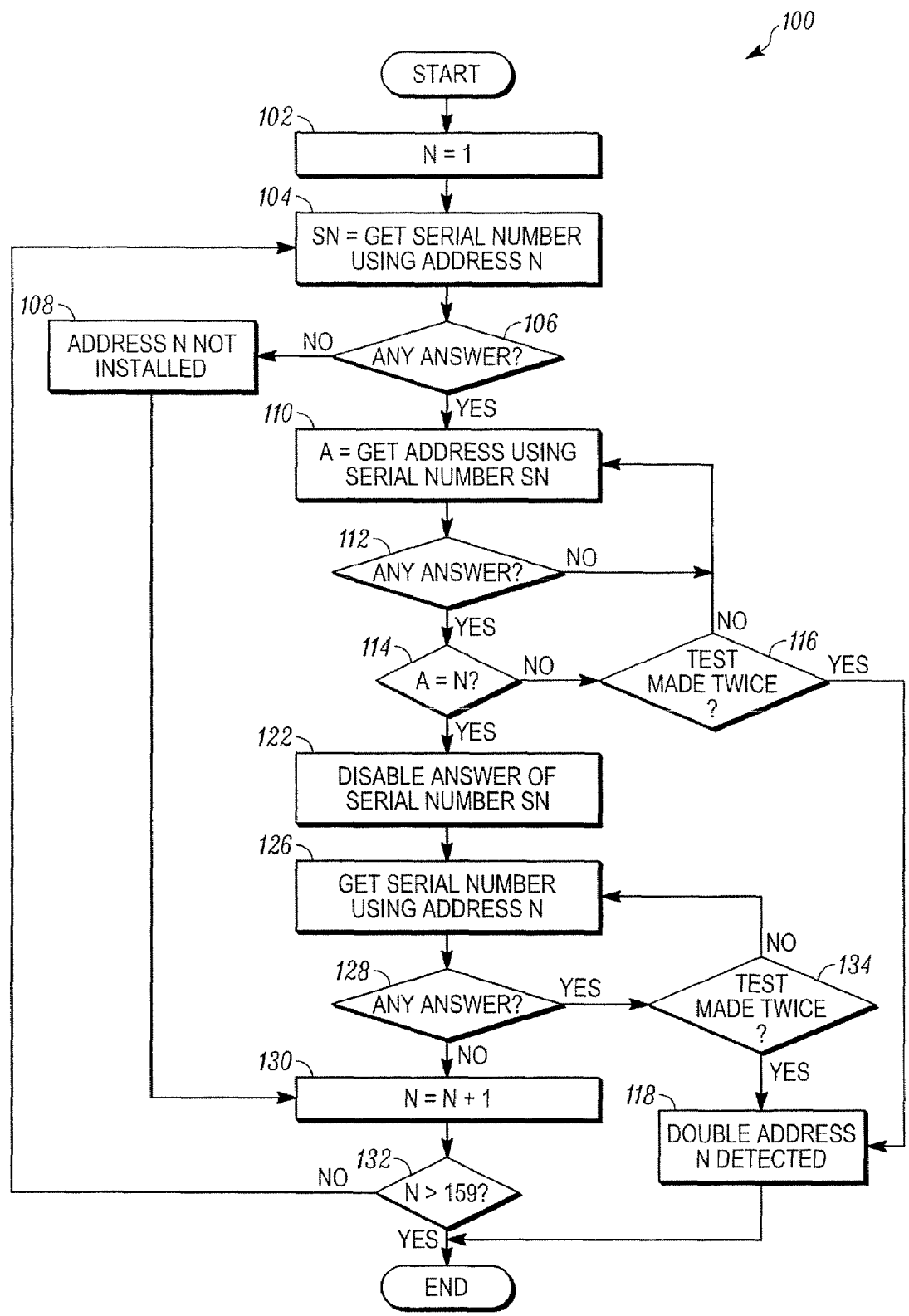
FIG. 2 is a block diagram illustrating a method in accordance with the invention.

FIG. 2 illustrates a method 100 of double address detection in accordance with the invention. Initially, an address indicator is set to an initial value such as 1, at 102. Next, a command is issued to obtain a serial number from a unit having the address N at 104.

A determination is made, 106, whether there is an answer from the address unit. If not, the unit having an address N has not been installed, 108. If there is a response, a command is issued requesting that the unit identified by a communicated serial number return its address, 110.

A determination is made, 112, as to whether an address has been returned from the unit having the identified serial number. If so, a determination, 114, is made as to whether the returned address corresponds or equals the expected address N. If not, the test is repeated several times, 116. If consistent results are obtained, a situation where two units have been assigned the same address N has been detected, 118.

Where the returned address equals or corresponds to the expected address N, a command can be issued, 122, to the relevant unit to disable further answers from the unit having serial number SN. A request is then issued, 126, to retrieve the serial number of the unit having the address N. If there is no answer, 128, then the value of the address can be incremented, 130, to address the next unit. A determination can be made, 132, as to whether the current address falls within a predetermined range of unit addresses. If so, the serial number of the next address is then obtained, 104. Otherwise the process terminates.

Where an answer has been received 128, the process is repeated for confirmation 134. If the addressed unit N returns a serial number in response to two subsequent requests, then a second having the same address N has been detected 118.

It will be understood that the process 100 is not limited to any particular communications protocol. Further, it will be understood that the process 100 is usable with a wide variety of addressable systems of which ambient condition monitoring systems, are exemplary only and not limitations of the present invention.

The following Examples illustrate aspects of processing 100.

EXAMPLE 1

Units installed with:
Address 1—serial no. 01.A0.B0.07
Address 2—serial no. 01.10.B0.08
Address 3—serial no. 01.FA.31.17
Step 1:
Read S/N using Address 1→01.A0.B0.07
Read Address using S/N 01.A0.B0.07→address 1
Disable Answer using S/N 01.A0.B0.07
Read S/N using Address 1→no answer
Step 2: Read S/N using Address 2→01.10.B0.08
Read Address using S/N 01.10.B0.08→4 address 2
Disable Answer using S/N 01.10.B0.08
Read S/N using Address 2→no answer
Step 3: Read S/N using Address 3→01.FA.31.17
Read Address using S/N 01.FA.31.17→address 3
Disable Answer using S/N 01.FA.31.17
Read S/N using Address 3→no answer
Step 4: Read S/N using Address 4→no answer
Read S/N using Address 5→no answer
. . .
Read S/N using Address 159→no answer
NO DOUBLE ADDRESS

EXAMPLE 2

Units installed with:
Address 1→serial no. 01.10.F1.20
Address 2—serial no. 01.10.A0.00
Address 3—serial no. 01.10.75.31
Address 2—serial no. 01.10.00.20→(WRONG ADDRESS!)
Step 1: Read S/N using Address 1→01.10.F1.20
Read Address using S/N 01.10.F1.20→address 1
Disable Answer using S/N 01.10.F1.20
Read S/N using Address 1→no answer
Step 2: Read S/N using Address 2→01.10.A0.20
(=01.10.A0.00 or 01.10.00.20)

Read Address using S/N 01.10.A0.20→no answer!
Read Address using S/N 01.10.A0.20→no answer!
ADDRESS 2 IS DOUBLE

EXAMPLE 3

Units installed with:
Address 1→serial no. 01.10.F1.10
Address 1→serial no. 01.10.F1.01→(WRONG ADDRESS!)
Address 3—serial no. 01.10.F7.35
Address 4—serial no. 01.10.F1.11
Step 1: Read S/N using Address 1→01.10.F1.11
(=01.10.F1.10 or 01.10.F1.01)
Read Address using S/N 01.10.F1.11→address 4
Read Address using S/N 01.10.F1.11→address 4
ADDRESS 1 IS DOUBLE

EXAMPLE 4

Units installed with:
Address 1—serial no. 01.10.F1.10
Address 1—serial no. 01.10.F1.01→(WRONG ADDRESS!)
Address 3—serial no. 01.10.F7.35
Address 1—serial no. 01.10.F1.11→(WRONG ADDRESS!)
Step 1: Read S/N using Address 1→01.10.F1.11
(=01.10.F1.10 or 01.10.F1.01 or 01.10.F1.11)
Read Address using S/N 01.10.F1.11→address 1
Disable Answer using S/N 01.10.F1.11
Read S/N using Address 1→01.10.F1.11
(=01.10.F1.10 or 01.10.F1.01)
Read S/N using Address 1→01.10.F1.11
(=01.10.F1.10 or 01.10.F1.01)
ADDRESS 1 IS DOUBLE Those of skill will understand that the method 100 of FIG. 2 could be implemented in software and stored and executed at the control unit 14. In that regard, a table of unit serial numbers and assigned addresses can also be maintained at the unit 14.

Neither the location where the method 100 is carried out, nor the particular form of software which might be used to implement the method 100, are limitations of the present invention. Processing wholly or in part to implement the method 100 can be distributed across an ambient condition monitoring system such as a system 10 at a variety of programmable processors. It will be understood that the method 100 could be carried on in real time while the related ambient condition system, such as the system 10, is carrying out its normal operational functions. Alternately, method 100 can be implemented as a part of installation or expansion of such systems.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
establishing a device address;
requesting a pre-assigned identification number of the device; and
responsive to the requesting, evaluating received results and if the results are not indicative of a missing device, issuing a command using the results as a device identification number to provide an associated address; and
comparing the device address to the associated address, and if they are the same, issuing a disable command to the device having that device identification number.

2. A method as in claim 1 which includes establishing another device address.

3. A method as in claim 2 where establishing another device address includes incrementing an established address.

4. A method as in claim 3 which includes determining if responses from devices with addresses in a predetermined range have been evaluated.

5. A method as in claim 1 where evaluating includes at least one of determining that no device has responded, determining that a single device has responded, or determining that multiple devices have responded.

6. A method as in claim 5 where, responsive to a single device having responded, the received results are associated as the pre-assigned identification number of the device.

7. A method as in claim 6 which includes altering the established device address, and determining if the altered address is within a pre-established range.

8. A method as in claim 5 which includes storing a multiple device indication after determining that multiple devices have responded.

9. A method as in claim 8 which includes conducting additional evaluations to determine an identification number of another device having the same address.

10. An apparatus that evaluates addresses assigned to a plurality of devices comprising:
a programmable processor;
software which establishes an address to be evaluated;
software, executable by the processor, that issues a request for a device identification number to at least one device having the address assigned thereto; and if the response is not a no device present indicium, the processor issues a command, using the response as a device identification number, to provide an associated address;
software executable by the processor that evaluates the associated address for the presence of multiple responses and including comparing the device address to the associated address, and if they are the same, issuing a disable command to the device having that device identification number.

11. An apparatus as in claim 10 which includes additional software to alter the address to be evaluated.

12. An apparatus as in claim 11 that includes further software that determines if that altered address is one of an acceptable address.

13. An apparatus as in claim 12 where an address is altered by being incremented.

14. An apparatus as in claim 10 where a medium couples the processor to members of the plurality of devices.

15. An apparatus as in claim 14 where the processor issues commands, via the medium, to members of the plurality.

16. An apparatus as in claim 15 where the commands include at least, get an address using a serial number, get a serial number of a device using an address, and disabling an answer from a device having a specified serial number.

17. An apparatus that evaluates addresses assigned to a plurality of devices comprising:
a programmable processor;
software executable by the processor which establishes an address to be evaluated;
software, executable by the processor, that issues a request for a device identification number to at least one device having the address assigned thereto;

software executable by the processor that evaluates a received identification number for the presence of multiple responses;

where a medium couples the processor to members of the plurality of devices;

where the processor issues commands, via the medium, to members of the plurality;

where the processor issues a command to a device, having a selected address, to provide its serial number; and where the processor evaluates a response from the device, and, if the response is not a no device present indicium, the processor issues a command, using the response as a serial number, to provide the associated address and including comparing the device address to the associated address, and if they are the same, issuing a disable command to the device having that device identification number.

18. An apparatus as in claim 17 where the processor evaluates a received address relative to the selected address.

19. An apparatus as in claim 18 where the processor, responsive to an evaluation generates a multiple address indicium.

* * * * *